United States Patent [19]

Schiappa et al.

[11] Patent Number: 4,729,928

[45] Date of Patent: Mar. 8, 1988

[54] DURABLE HIGH GLOSS WATER-BASED COATING COMPOSITION

[76] Inventors: Attilio V. Schiappa, 7808 NW. 79th Pl., Kansas City, Mo. 64152; Wilson M. Ferrell, 928 Sunset Ave., Petersburg, Va. 23805

[21] Appl. No.: 36,634

[22] Filed: Apr. 10, 1987

[51] Int. Cl.$^4$ .................... B05D 3/02; C08K 5/34; B32B 23/08
[52] U.S. Cl. .................... 428/514; 156/334; 427/391; 428/537.1; 524/104
[58] Field of Search .................... 427/391; 524/104; 156/334; 428/514, 537.1

[56] References Cited

U.S. PATENT DOCUMENTS

| | | | |
|---|---|---|---|
| 3,113,122 | 12/1963 | La Combe et al. | 524/104 X |
| 3,234,158 | 2/1966 | Pfluger et al. | 525/104 X |
| 3,647,732 | 3/1972 | Gower et al. | 525/104 X |
| 3,650,664 | 3/1972 | De Graff et al. | 427/391 |
| 3,704,157 | 11/1972 | McDonald | 427/391 X |
| 4,298,652 | 11/1981 | Suzuki et al. | 427/391 X |
| 4,610,920 | 9/1986 | Mudge et al. | 427/391 X |
| 4,657,821 | 4/1987 | Ura et al. | 427/391 X |
| 4,675,354 | 6/1987 | Sperling | 524/104 X |

FOREIGN PATENT DOCUMENTS 53-130734  11/1978  Japan .................... 524/104

*Primary Examiner*—Thurman K. Page
*Attorney, Agent, or Firm*—Warren N. Low; Renee S. Rutkowski

[57] ABSTRACT

A durable high gloss water-based coating composition highly useful for multicolor printing or as printing inks, and like uses, and which is characterized by a proportioned mixture of ethylene acrylic acid and N-methyl-pyrrolidone, with resultant avoidance of environmental or toxicity problems, as well as formulation, application, or utilization difficulties.

23 Claims, No Drawings

DURABLE HIGH GLOSS WATER-BASED COATING COMPOSITION

BACKGROUND OF THE INVENTION

In numerous commercial and industrial coating and coating-related applications there inherently exists a need for significant improvement in the nature of the products produced thereby and the manufacturing processes or treatments utilized in producing the same, with a view towards enhanced results, lowered costs, avoidance of industrial hazards, and compliance with environmental safeguards.

Thus, in various commercial and industrial applications, diverse coating, laminating, adhesive-applying, labelling, and printing operations are performed which quite frequently utilize carriers, vehicles, solvents or the like which carry environmental hazards all of excess volatility, flammability, and indeed even presence of carcinogens, among other deleterious aspects. Thus, one of the most widely-used such coatings to enhance multicolor printing by high sheen or gloss and to provide a measure of wear protection utilizes nitrocellulose carried in an acetone solvent.

Heretofore, it has been conventional and indeed necessary in the printing arts in high resolution color printing, rotogravure and the like, especially for high gloss products as advertising literature, display advertising, high publication covers and the like, to seek to enhance, protect, and preserve the printed web, as a color printed web in a Cerruti press, by the coating of the printed matter with an acetone solution of nitrocellulose. Such coating is conventional and widely used throughout the paper and printing industry, and features quite low relative cost heretofore. Nitrocellulose and like related coatings, however, can be difficult to handle by virtue of volatility and flammability characteristics requiring careful handling in the necessary effort to impart a protective finish to printed matter. Conventionally, nitrocellulose coatings are carried in a acetone solvent which require careful drying after application and wherein indeed application as by rollers of the like is difficult due to a clinging nature of the nitrocellulose to the roller.

In addition thereto, there follows the unavoidable environmental hazards of organic solvents which are highly undesirable and indeed by increasing regulation from the EPA as well as other Federal and State authorities calls for increased care and expense in the use, handling, and recovery pretreatment of the same.

While such coatings do provide the necessary and desirable high gloss or reflectivity, the same are not sturdy or durable under exposed or extended wear conditions, with quickly developing cracks or other degradation of the reflectance, all resulting in a product not especially desirable to advertisers and printers on any basis other than very low cost. To the durability problem must be added the increasing economic burden, both in capital equipment and operating expense, of compliance with environmental regulation, principally as to containment and recovery of the organic acetone vehicle, thereby increasing the previously relatively low costs.

Another technique widely employed in providing protective coatings on printed material as may be needed for high visibility and adverse wear conditions, and which avoids the hazards and difficulties of nitrocellulose coatings, is the lamination of a separate protective web of polymeric material over the printed stock. While providing good wear protection and avoiding the difficulties of nitrocellulose coatings, several disadvantages manifest themselves, including the entire separate and major manipulative step of effecting a two-web lamination operation, with necessary additional equipment. Further, the overlay of a separate polymeric web, while quite transparent, nonetheless is incapable of imparting a high gloss to the finished article. Thus, while a highly desired gloss or reflectivity reading on a standard reflectometer in the printing industry might be on the order of 90 or above, laminated web readings may ordinarily be found much lower, as 73 or 74, a substantial diminution in eye-catching appeal. For this reason, except where virtually prohibited, nitrocellulose coatings have hitherto remained preferred.

Efforts are continuously underway to find some manner of avoiding such problems and wherein a common approach has been to seek to utilize a water-based coating vehicle or the like. Such efforts heretofore in providing aqueous carriers, however, have not been successful, including difficulty of manipulation, unsuitablity for the substrate or environment with which the same are associated, drying difficulties, poor resultant products, as well as in many cases a necessity of completely altering the equipment required with resultant unwanted capital expense and the unavoidable discard of perfectly ably functioning existing equipment.

There is, therefore, a major need for an improvement in this area of industrial activity.

While improved high gloss, durable, easily curable coatings for printed stock are major area of interest, collaterally thereto, there is companion interest in and need for high gloss printing inks, per se, which similarly avoid environmental and equipment problems, while yet providing an enhanced, bright ink image. Again, if feasible, water-base inks avoiding volatility, flammability, and organic solvent concerns are extremely desirable.

BRIEF SUMMARY OF THE INVENTION

All of the foregoing difficulties, hazards, and regulatory problems are overcome by the composition of the present invention which uniquely provides equal or superior gloss in coating operations, provides ease of application and reliability and smoothness thereof, and exhibits astonishing weatherproof and durability characteristics. These highly desirable objects are achieved while simultaneously avoiding all of the difficulties of organic solvent-based coating systems as heretofore used, primarily nitrocellulose systems.

We have made the discovery of a new chemical composition and mode of utilization that overcomes prior objections to previous techniques and chemicals, as well as provides superior results as to gloss, durability, brightness, avoids environmental hazards, and is readily adaptable to presently employed equipment and processes, thereby obviating unwanted capital expense.

Specifically, we have discovered a composition formed from ethylene acrylic acid (EAA) and N-methylpyrrolidone (NMP) in an aqueous carrier remarkably achieves highly advantageous results in diverse commercial applications and industries, notably the printing trade in the production of high gloss artwork and printing for long service use, but also in other related environments as printing inks, as will be set forth more particularly hereinafter.

It will be seen that the unique combination of EAA and NMP in a water carrier inherently eliminates the hitherto pronounced environmental problems occasioned by organic solvents, the containment and recovery of which is increasingly difficult and bordering on the prohibitively expensive in order to comply with necessary workplace regulations as to surrounding air environments.

Ethylene acrylic acid itself has long been used and widely sold for diverse industrial applications and coating uses as an adhesive, in multilayer laminates, and other purposes. Its general handling advantages and lack of toxicity are known. In like manner, N-methylpyrrolidone is a commercially produced chemical intermediate material well known in the art as a solvent for diverse plastics with numerous uses in the production of polymers, surface coatings, pesticides, dyes, and the like.

By the invention herein, it has been discovered that the proper proportioning of EAA and NMP together provide a unique easily handled substance which in an aqueous carrier permits ready and convenient application in numerous environments and especially in the production of high gloss printed matter and printing inks.

DETAILED DESCRIPTION OF THE INVENTION

As indicated, the invention comprises a proper composition formed of ethylene acrylic acid and N-methylpyrrolidone. EAA is a readily available industrial chemical prepared by diverse companies and has been sold under diverse commercial labels as, for example, the trademark "PRIMACOR" of Dow Chemical Company as applied to an aqueous dispersion thereof. The physical properties, processing information, chemistry and structure of the substance are quite well known and are available in textbooks and also in reference publications of diverse suppliers. EAA is a versatile substance, widely used in molding, twisting, extruding, etc.

Another supplier of EAA is the Morton Thiokol Corp. wherein the same is available as a dispersion under the trademark "ADCOTE" of varying percentages, wherein a 35% EAA dispersion embraces the grade designation "50T 4990" while a 25% dispersion changes the last identifier to "4983", for example. Dow Chemical Co. is a supplier of EAA proper in the form of beads from which an aqueous dispersion can be readily made. At one time a "ready-mixed" aqueous dispersion thereof was available from that company under the trademark "PRIMACOR" as noted.

The same applies to the substance NMP, and which may be identified by the chemical formula $C_5H_9NO$, and is also known as 1-methyl-2-pyrrolidinone. Available from a number of suppliers, one such is BASF Corporation. From this and other suppliers, as well as textbooks, the characteristics and prior uses of NMP are likewise well known. The chemical is customarily used in a plurality of intermediate chemical reactions and is considered an inert, stable, and polar solvent for difficult reactions in the nature of an auxiliary catalyst. Other uses include the production of aromatics, lubricating oils, and as a industrial solvent for plastics, waxes and the like. NMP is also known to improve the property of surface coatings that are baked at high temperatures as in the manufacture of paints, for example. Other uses appear in the literature.

While the uses, therefore, both EAA and NMP are widely known and explored in the literature, prior to applicants' invention herein it was not known that a mixture of EAA and NMP could produce a superior water-based coating composition of astonishing durability, ease of application, with gloss and wear characteristics heretofore unobtainable in the coating, printing and ink arts.

The present invention, therefore, embraces a novel and unique composition achieved by the blending of these two substances together in association with an aqueous carrier for application utilization. In so doing, excellent durability, gloss, and brightness results are achieved in a number of environments Advantageously, the composition has no significant toxicity and as noted, EAA itself is a widely accepted and FDA approved substance without environmental problems.

In a preferred form, the water dispersion of EAA and NMP for coating purposes, for example, is on the order by weight of 4% NMP, 34% EAA and the balance water. The formulation is capable of some variance as may be requisite for differing coating or utilization conditions. At this time as a result of experimentation the preferred ranges embrace 2%-8% NMP and 25%-40% EAA with the balance water.

The composition of the present invention in the printing arts is usable with numerous substrates, primarily paper, and is most commonly employed in the advertising and gloss printing field on heavy stock on the order of 7 to 12 point stock, typically 10-point stock, and which is commonly conventional clay-coated paper known in the trade as "valentine" stock, by virtue of the relative thickness of the paper as compared to thinner tissues or paper.

The use of EAA in conjunction with NMP as aforesaid to provide outstanding results in the coating arts was unknown and unsuspected. The composition of the invention flows readily from the applicator rolls and onto the paper substrate with no problem of adhesion of the coated materials to the rolls with resultant improper coating of the paper.

Similarly, while NMP is commonly used as a solvent and otherwise as noted, its use in the subject composition with EAA effectively causes the same to function as an adhesive to facilitate bonding of the coating to the paper substrate. The exact mechanism for this is not presently known.

Further, the coating of the subject invention is readily applied to substrates using known equipment, whereby capital investment costs are minimized while still achieving a superior high gloss product.

Thus, in the case of multicolor printed paper commonly employed in advertising and high-quality printed publications, as illustratively covers for annual reports, technical manuals, promotional or advertisihg card stock carried on vehicles, as buses, shopping carts, etc., running webs of printed stock may be fed over and wrapped about conventional rubber or stainless steel rolls. During passage therearound, the EAA-NMP composition in aqueous dispersion may be applied by an applicator roll and supply trough of usual form, the level of coating material in the trough being maintained and supplied by a usual pumping level control system.

After coating of the stock, the same needs to be dried and the water driven off. Heretofore, with organic solvents, expensive equipment and carefully controlled procedures were required to minimize hazard as well as to comply with federal and state environmental requirements as to organic volatiles.

By the present invention, however, utilizing a water-based system, such concerns are totally obviated while yet producing a not only acceptable, but superior product. Accordingly, the wet-coated stock need only pass through a heated drying zone to drive off the water carrier as water vapor. This may be readily effected by known heating arrangements as by guiding the running web in a vertical path passing through a gas-fired oven at 200° C. or so, for example. The web may be led in a "hairpin" path over a top web reversing roll with the coated stock exposed to the drying heat on both upwardly moving and downwardly moving reaches of the running length in passing through the heating and drying zone. This may be effected at the normal running speed of the equipment, say 200–250 fpm, whereby no slowdown in operation is called for. Other like means known in the art may be employed.

Further, in terms of providing high gloss to a printed substrate, repeat coatings can enhance the gloss. Thus, there may be two, three or more coats of the subject composition, and indeed there could be as many as five.

The first coat will be relatively heavier as some penetration of the web occurs on a substrate as paper, while the later coats will be much thinner. Illustratively, and without being limited in this respect, in applying a coating to a printed paper substrate having an area on the order of 0.53 square feet, about 1½ grams of the coating composition is required, and wherein approximately 0.8 grams will be used for the first coat while slightly approximately 0.4 grams will be required for the second coat and somewhat less for the third coat.

Actual durability tests of the subject EAA-NMP coating composition as compared to a conventional nitrocellulose coating on identical printed paper substrate show (1) a degree of gloss as high or higher than usual nitrocellulose coatings, thereby enhancing attractiveness of eye-catching viewability, and (2) durability under adverse exposed, weather and moisture conditions far exceeding that of nitrocellulose or polyolefin-laminated coatings.

Thus, coated, printed stock of the invention has been subjected to standard ASTM tape tests, and no tearing, peeling, or degradation of the coated stock appears. Similarly, under flexing and bending tests, the original high gloss is retained.

As indicated above, a typical polyethylene laminate protective film over printing will produce a low standardized gloss reading on the order of 73–74. By contrast, a plural coating according to the invention herein will result in an excellent high gloss reading on the order of 89–94 after a third coating, and even a reading of 79 on the second coating.

Further, the longer the cure, the higher the gloss. As the coating further hardens, gloss readings may be expected to increase approximately 7%–10%.

As indicated here and above in addition to the outstanding results of the instant invention as applied to the printing and coating arts, the subject invention is highly usable with excellent results in the printing arts as an ink per se. Thus, a water-based EAA-NMP composition to which has been added any conventional printing coloration pigments, as zinc oxide, cadmium yellow, tin oxide, etc for a desired color or pigmentation, and to which also any conventional filler or additive may be applied, as clay, wax, surfactants, sodium silicate, etc. all as well known in the trade, results in a superior high-gloss ink.

More particularly, while wide ranges in a water dispersion of EAA may be employed, a proportion by weight on the order of 35% to 40% EAA along with 1% to 2% NMP with respect to the basic ink vehicle is found to be quite satisfactory in producing an extremely high-gloss ink. This is of course exclusive of any of the conventional pigments, additives or flattening agents, etc..

Thus, typically, a quantity of EAA in aqueous dispersion is heated to the order of 130°–140° C. and stirred, and while stirring the appropriate pigment or pigments are added. Thereafter the small proportion of NMP is slowly introduced. The introduction of the NMP effects an exothermic reaction approaching 200° C. (or 390° F.), the reason for which is presently uncertain. In any event, following the introduction of the NMP, the pigments introduced into the ink bloom into a full, rich color and the resultant ink may be applied in conventional to a substrate, whether paper, foil labels, or other conventional bases.

The ink of the invention is flexible, durable as above taught with respect to the EAA-NMP coating composition. It is acid and alkali resistant, waterproof and highly reflective of ultraviolet rays. This latter aspect is important in that ultraviolet absorption by exteriorly exposed printed matter results in reduction of the gloss and degradation of the ink matter. The same is highly resisted by the superior ink provided herein.

Heretofore, a water-based ink having such high gloss as well as the durability exhibited herein had been deemed all but impossible to obtain.

While we have described our invention largely with respect to coating and ink compositions achieving the outstanding results heretofore not achieved in the industry, it will be evident that the coating compositions of the instant invention may be adapted to other and related used falling within the intent and scope of the invention and the claims herein.

What we claim is:

1. A coating composition comprising ethylene acrylic acid (EAA) and N-methylpyrrolidone (NMP).

2. The coating composition of claim 1 wherein the proportion of EAA to NMP is between 20:1 and 5:1.

3. The coating composition of claim 2 further including an non-organic liquid carrier.

4. The coating composition of claim 3 wherein the carrier is water.

5. The coating composition of claim 4 wherein the proportion of water to EAA is between 3:1 and 1.3:1.

6. The coating composition of claim 4 wherein the composition comprises by weight percent, on the order of 35% EAA, 4% NMP, and 61% water.

7. The coating composition of claim 4 wherein the composition is an aqueous dispersion.

8. A durable high gloss article of manufacture comprising a printed substrate and the composition of claim 1 as a coating thereon.

9. The article of claim 8 wherein the substrate is paper.

10. The article of claim 9 wherein the paper has a weight on the order of 6 pt.–10 pt. stock.

11. A durable high gloss article of manufacture comprising a printed substrate and the composition of any one of claims 2–7 as a coating thereon.

12. The article of claim 11 wherein the substrate includes multicolor printing thereon.

13. The article of claim 8 including a plurality of said coatings thereon.

14. A bright printing ink comprising the composition of any one of claims 1-7 and a pigment.

15. A method of producing durable high gloss printed stock including the steps of:
   advancing a printed substrate into a coating station,
   coating the printed surface with a composition of ethylene acrylic acid (EAA) and N-methylpyrollidone (NMP) in an aqueous carrier, and,
   drying the coating.

16. The method of claim 15 wherein the substrate is a running web.

17. The method of claim 15 wherein the coating step is performed with a composition in which the proportion of EAA to NMP is between 20:1 and 5:1.

18. The method of claim 15 including the step of printing the substrate prior to the advancing step.

19. A method of making a durable high gloss coating composition comprising the steps of:
   providing a quantity of water,
   mixing a quantity of ethylene acrylic acid (EAA) with the water to form an aqueous dispersion thereof, and,
   adding a quantity of N-methylpyrollidone (NMP) to the EAA dispersion.

20. The method of claim 19 wherein the proportion of water to EAA is between 3:1 and 1.3:1, and wherein the porportion of EAA to NMP is between 20:1 and 5:1.

21. The method of claim 20 wherein the quantities by weight are on the order of 35% EAA, 4% NMP, and 61% water.

22. The method of making a bright printing ink comprising the steps of:
   providing a quantity of water,
   mixing a quantity of ethylene acrylic acid (EAA) with the water to form a dispersion therewith,
   adding a quantity of pigment, and,
   adding a quantity of N-methylpyrollidone (NMP) to the EAA-pigment dispersion.

23. The method of claim 22 wherein the quanities by weight are on the order of 35% to 40% EAA and 1%-2% NMP.

* * * * *